United States Patent [19]

McGrew

[11] 4,033,869
[45] July 5, 1977

[54] OIL SPILL CONFINING AND DIRECTING APPARATUS AND METHOD USING WATER SPRAY BOOMS

[75] Inventor: Jay L. McGrew, Littleton, Colo.

[73] Assignee: Marine Construction & Design Co., Seattle, Wash.

[22] Filed: June 5, 1974

[21] Appl. No.: 476,420

[52] U.S. Cl. .......................... 210/65; 210/DIG. 25; 210/242 S
[51] Int. Cl.² .................................. B01D 37/00
[58] Field of Search ........ 210/83, 84, 242, DIG. 21

[56] References Cited

UNITED STATES PATENTS

| | | | |
|---|---|---|---|
| 3,348,690 | 10/1967 | Cornelissen | 210/DIG. 21 |
| 3,561,601 | 2/1971 | McNeely | 210/DIG. 21 |
| 3,661,264 | 5/1972 | Peterson et al. | 210/242 |
| 3,762,169 | 10/1973 | Graham | 210/242 |
| 3,794,175 | 2/1974 | Stewart | 210/DIG. 21 |

*Primary Examiner*—Theodore A. Granger
*Attorney, Agent, or Firm*—Christensen, O'Connor, Garrison & Havelka

[57] ABSTRACT

An oil spill confining or sweeping system and method employing spray booms creating fine water spray curtains angled to the water's surface from an elevation above water level. Mounted divergently at the bow of a skimmer vessel, these spray curtains are effective to funnel the oil into the vessel's pick-up device ahead of the vessel without dispersing or emulsifying the oil. The fine spray particles making up the curtains have carrying effect sufficient to project entrained air with the spray to the water's surface independently of variations in distance between the booms and the water's surface attending passage of waves and swells.

15 Claims, 8 Drawing Figures

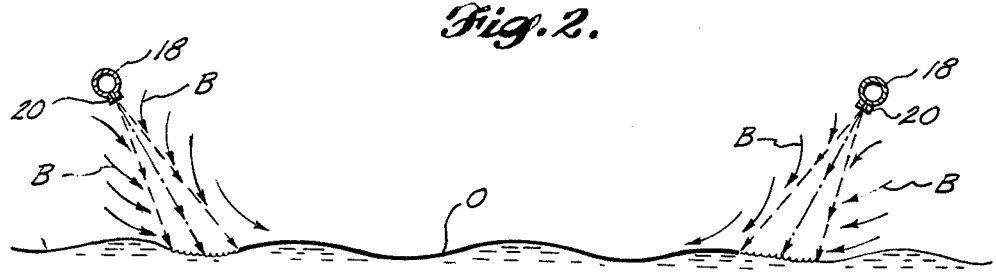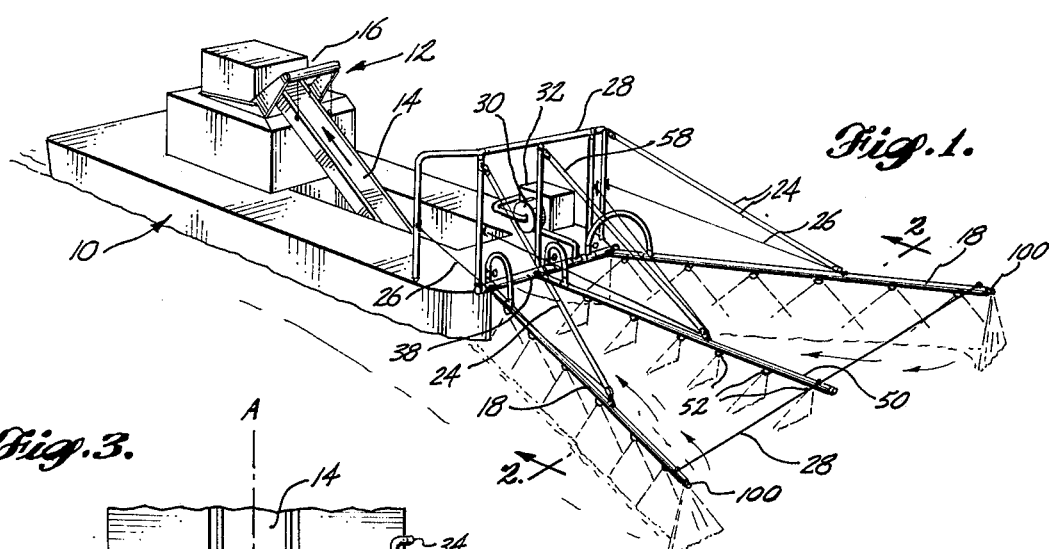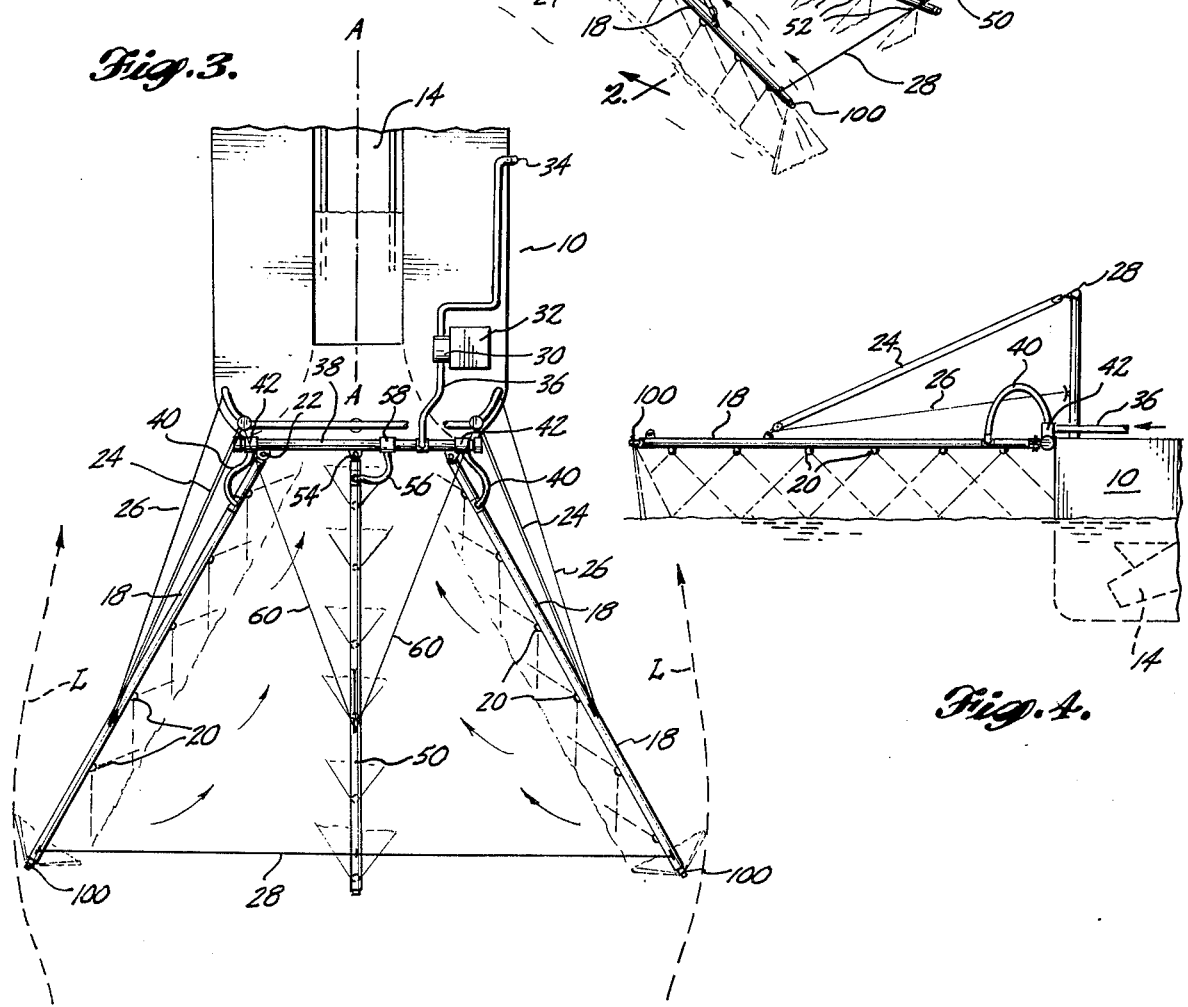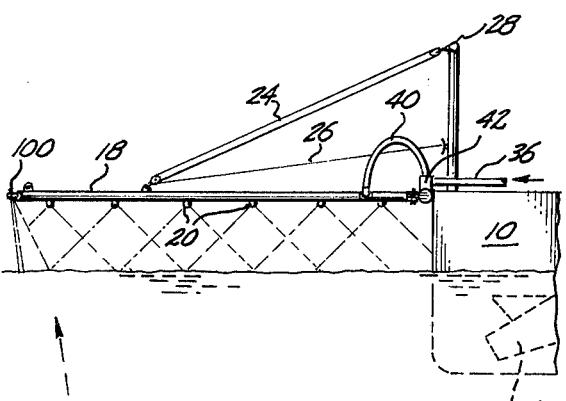

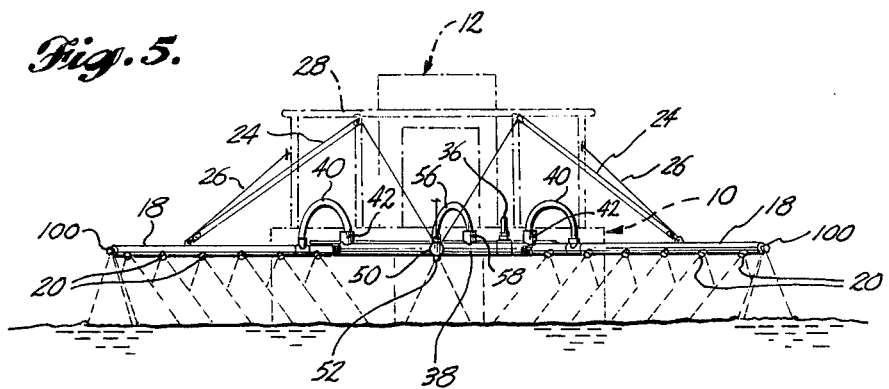
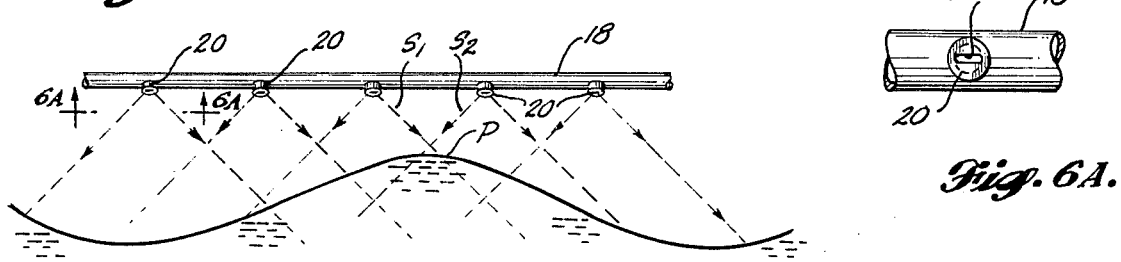
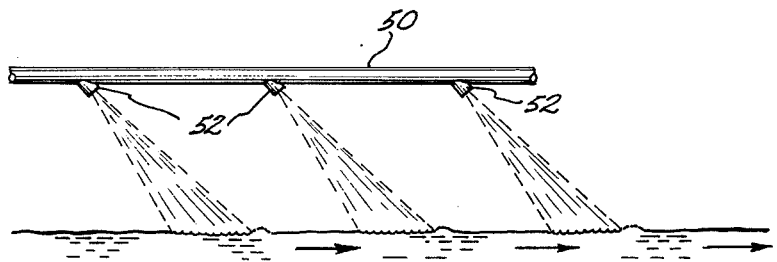

OIL SPILL CONFINING AND DIRECTING APPARATUS AND METHOD USING WATER SPRAY BOOMS

BACKGROUND OF THE INVENTION

This invention relates to improvements in apparatus and method for recovering oil spills on open water and more particularly to means for confining and directing oil spills into a pick-up or recovery device such as that disclosed in co-pending J. A. McGrew patent application Ser. No. 327,007, filed Jan. 26, 1973. While the invention is herein described in its presently preferred embodiment, it will be recognized that certain modifications and changes may be without departing from the essential features involved.

With most oil spill recovery devices operable on open water, such as a skimmer vessel employing a low-resistance flow-through reticular matrix pick-up belt of the characteristics described in the above-cited application, it is important that the oil remain at or near the surface either in a layer or at least in globules of a size that can be readily separated from the water. If unduly agitated immediately preceding or in connection with the recovery operation, the oil may be dispersed in very small particles, or even emulsified, so that it cannot be effectively picked up by the matrix, or by currents, much of it circulated below the surface out of reach of the pick-up device.

A principal technique previously used to confine and direct an oil spill so that it could be picked up by a recovery device consisted in the deployment of elongated floating booms or curtains stretched out along the edge or around the perimeter of the spill. These devices employed floats and formed a long physical barrier often half a mile or greater in length, making them awkward to deploy and very difficult to move or control once positioned. Usually, a positioning tug or other vessel made fast to each end of the barrier boom was necessary to hold it in place or move it about. Moreover, in choppy, rough water, slop-over could allow oil from the spill to escape over the boom. Experience also reveals that even with a boom having a barrier curtain suspended beneath it, currents may carry oil under the boom substantially without regard to depth of the curtain. Such oil spill confinement booms, while useful in certain situations, were not at all suited for mobile use in physical association with skimmer vessels having to travel at substantial speeds through the water in order to work a large area.

As an alternative to the floating boom, Muhler U.S. Pat. No. 3,659,713 discloses a non-submersion type mobile boom system employing gaseous discharge curtains to sweep and move or confine the spill. According to that patent, sheets of air moving downward at high velocity on an incline into impingement with the surface of the water will sweep the oil ahead of it, whereby it can be funneled effectively into the path of a recovery vessel. The stated purpose of using air in that case was to produce the desired "herding" or sweeping action without dispersing or emulsifying the oil, it apparently having been recognized that the long-standing use of streams of water discharged through hoses to move a spill did cause temporary dispersal and/or some emulsification.

With forced air curtains, particularly with booms of any substantial length disposed above the water's surface along the desired perimeter or edge zones as in the above-mentioned patent, large volumes of air would have to be compressed and distributed under substantial pressure from a slotted boom maintained at a suitable elevation in order to provide the necessary sweeping force at the water's surface to effectively confine or move the oil. Particularly this will be true when attempting to operate on windy days and/or in open water with the booms elevated clear of wave crests as they must be. Under these conditions, moreover, the effectiveness of the sheet of air impinging the surface of the wave crests situated near the boom will be much greater than in the troughs, sometimes a matter of feet below the crests. The same U.S. Pat. No. 3,569,713 mentions the possibility of pumping water or other liquid through the same slotted booms; however, it is found that sheets of water forcibly directed against the edge of an oil spill churn up the water and oil and are therefore self-defeating in applications wherein dispersal, pumping and emulsification of the oil presents problems.

A chief object of the present invention is to devise an improved non-submersion type boom or similar oil spill confining, sweeping or directing apparatus and method overcoming the aforementioned difficulties and limitations. More specifically, it is an object hereof to provide a new and improved, economic and versatile system and technique for sweeping surface oil which utilizes cross-sectionally elongated fluid discharge curtains or patterns of force-producing flow directed against the water's surface, and which may employ discharge booms or the like maintained at suitable elevation above the water's surface, yet operate effectively under varying conditions of wind, swells, and chop. A related object is to devise such a system which may be used to advantage both in stationary recovery installations as well as in conjunction with and as part of highly mobile and rapid moving skimmer vessels.

A further and more specific object hereof is to devise such a system and technique wherein water itself may be utilized effectively to create the required fluid flow forces acting on the oil spill, and such that the cost, weight and space economics of a simple pump, conduit and nozzle arrangement present additional advantages in the improved apparatus.

A further object hereof is to devise an effective oil spill confining and directing system and method operable on or in direct physical association with a rapid-moving oil spill recovery (skimmer) vessel without appreciable escapement of the oil due to dispersal or emulsification or to leakage through or around the fluid flow curtain confining and directing part of the system.

BRIEF DESCRIPTION OF THE INVENTION

In accordance with this invention, it has been discovered that the requisite fluid flow forces effective as a sweep curtain to confine and sweep an oil spill may be created by use of water, and more specifically by forming sprays of water sufficient in velocity and volume to entrain air inductively with the water droplets, sufficiently large by their momentum effect to have the requisite carrying effect over the varying distances to wave crests and troughs, yet sufficiently small in droplet size and impact effect on the oil spill that the oil is not dispersed or emulsified by the spray. Furthermore, by providing a series of successively spaced water spray nozzles along support booms, preferably in the form of water headers or conduits supplying the pressure nozzles, overlapping spray patterns are formed with the effect of a continuous uninterrupted curtain of fluid impacting the wafer's surface. With such booms divergently positioned ahead of and at opposite sides of an oil spill recovery vessel oil is confined and directed into the path of advance of the recovery vessel from a wide swath with minimum expenditure of energy, i.e. merely the pumping of water through the nozzle system. With sprays of relatively thin and wide configuration overlapping each other at or before impact with the water's surface gaps in the lines or zones of coverage are avoided through which oil would otherwise escape. In operation when the conditions of spray volume, velocity and droplet size range are properly adjusted the sprays combine to produce a ruffling effect on the water's surface with a slight foaming tendency under impact of the spray.

DESCRIPTION OF DRAWINGS

FIG. 1 is a perspective view of an oil spill skimmer vessel incorporating a spray boom system in the preferred embodiment of the invention.

FIG. 2 is a sectional view taken on line 2—2 in FIG. 1, showing the action of the sweep or confinement spray booms and omitting other parts of the skimmer vessel including the central in-sweep spray boom.

FIG. 3 is a top view of the spray boom system and the forward portion of the skimmer vessel supporting the same.

FIG. 4 is a side elevation view of the apparatus shown in FIG. 3.

FIG. 5 is a front elevation view of the apparatus shown in FIG. 3.

FIG. 6 is a side elevation view of a single spray boom of the type mounted on each side of the skimmer vessel.

FIG. 6a is a fragmentary view taken on line 6a—6a in FIG. 6.

FIG. 7 is a side elevation view of a portion of the in-sweep boom acting on a laterally confined oil spill.

DESCRIPTION OF THE ILLUSTRATED EMBODIMENT

Referring to the drawings, the oil skimmer vessel 10 has mounted thereon, between its catamaran hulls, a pick-up device 12 including an endless belt or matrix of low resistance flow-through reticular foam material of the characteristics described in the McGrew patent application Ser. No. 327,007 filed Jan. 26, 1973. The pick-up device 14 incorporating the endless pick-up belt has a suitable housing and associated drive and guide mechanism for the belt, the details of which are not critical to the present invention. The lower end portion of the belt is immersed to a desired depth in the water (FIG. 4) so that water carrying spill oil on or near the surface is permitted to flow into and through the matric openings of the belt. The oleophilic hydrophobic properties of the belt strands and connecting nodes cause the oil to adhere to the strands and nodes wherein the water is permitted to pass freely through the belt. The belt's upper stretch, disposed at an incline to the surface of the water, is driven to move upwardly toward the collecting device 16 mounted on the vessel about water level and incorporating a means such as a squeeze roll to remove oil from the belt and collect it in a container. With the vessel driven forwardly, and the oil pick-up belt moving in its endless circuit path in device 14, a large area of water covered by an oil spill can be systematically swept to pick up the oil before it can spread altogether out of control.

While the vessel 10 is designed to operate at speeds of three knots and higher, its width, and particularly the width of the skimmer belt mounted in the pick-up device 14, has practical limitations. In order to widen the swath covered by the vessel means are provided to gather and funnel the surface water with oil into the path encountered by the belt. The present invention featuring the novel spray or sweep boom concept achieves this objective and the related purposes previously set forth in a manner which does not unduly disturb or disrupt the oil spill ahead of the belt so as to prevent its contact with and adherence to the belt's fibers and nodes.

Mounted on the forward end of the skimmer vessel at each side thereof is an elongated plenum pipe or spray boom 18 which mounts and feeds a series of nozzles 20 stationed at intervals along the length thereof. These downwardly directed nozzles produce flat fan-like spray patterns which, with the booms disposed generally horizontally in operative positions, lie in common planes inclined to the horizontal inwardly in relation to the longitudinal axis of the vessel, A—A. Each boom is mounted projecting forwardly from vessel 10 on a universal support 22 enabling it to be raised variably and also swung laterally or sidewise so as to vary the divergence angle between the booms. In their lowered, operating position (FIGS. 1 and 4) the booms are suspended substantially horizontally at a predetermined height such as two feet above the water's surface. Support for maintaining the booms in a selected position of elevation is provided by block and tackle devices 24 anchored to an elevated structure such as boom rail 26. Additional block and tackle arrangements 26 serve as lateral stays or vangs holding the booms against swinging inwardly toward each other, whereas a connecting line 28 extending between the outer ends of the booms 18 prevents them from swinging apart further than is desired under tension forces applied by the side stays 26. When the vessel is traveling, such as in the case of a small portable vessel that might be trailered, the booms are raised into an upright position and lashed to the bow rail 28.

Water under pressure is delivered to the booms 18 by a pump 30 driven by a motor 32. The pump has a suction inlet 34 below the water's surface and an outlet 36 extending to a header pipe 38 extending between the bows of the spaced catamaran vessel hulls. A flexible hose connection 40 between the headers and each boom 18, delivers water to the boom from the header by way of a shut-off valve 42.

In addition to the laterally effective oil sweep or confinement booms 18, the system also incorporated a central or intermediate in-sweep boom 50 projecting forwardly from the bow of the vessel at a mounting location midway between the side booms 18. The boom 50 has a series of spray nozzles 52 spaced at intervals along its length, which produce flat (i.e. wide and narrow) fan-like spray patterns. However, in this case the paddle spraped spray patterns are oriented with their wide dimensions oriented transversely to the length of the boom and project at an incline rearwardly in the direction of the supporting vessel 10. The in-sweep boom 50 is also supported on a universal joint 54 and is connected by a flexible hose 56 through a shut-off valve 58 to the header 38. In operating position, it is also horizontally suspended by a block and tackle device 58 connected to the bow rail 28. Side stray lines 60 extend from the sides of the bow rail 28 forwardly to an intermediate point on the boom 50 in converging relationship so as to stabilize the position of the boom 50 in a lateral sense. Varying the relative lengths of the lines 60 permits adjustively swinging the boom transversely of the vessel into variously oriented positions angled to the axis A—A, whereby oil confined in the space between the side booms 18 may be reached and swept into the pick-up throat of the vessel occupied by the oil pick-up belt system 14. The in-sweep boom 50 comes into play primarily when the vessel is stationary in the water or when relative forward motion is very slow. The sprays from the boom 50 tend to create a surface current which forces the oil to the belt device 14, such as when the vessel is stationed next to a dock or piling system and it is desirable to induce flow of the surface water carrying oil into the pick-up device when the vessel otherwise cannot gain physical access to the spaced between the pilings.

As depicted in FIGS. 1, 4 and 6 the patterns of spray emitted by the aligned, spaced nozzles 20 in each of nozzle booms 18 are directed in a common plane containing the boom axis or longitudinal center line and inclined or sloped to the water's surface in the direction toward the opposing boom. Preferably, the incline angle as shown in FIG. 2 is approximately 45° to the horizontal. Preferably the wide dimension of the patterns or spray in their common plane indicated represent a spray divergent angle of about 90° (FIG. 4). At right angles to such plane, the patterns are preferably thin, such as 10° such that a certain of spray is effectively created by the series of nozzles. To produce the individual spray patterns making up such curtains, the spray nozzles have an elongated orifice 20A as depicted in FIG. 6a with the long dimension extending parallel to the length of the spray boom 18. As shown in FIG. 2, wherein the curtains of spray are directed against the water's surface, an oil slick O is swept by these opposing spray curtains toward the region between the booms and thus into the path of approach to the oil pick-up device 14. Moreover, the spacing between successive nozzles 20 along the spray boom is made such that at the selected operating heights of the boom water level, the successively positioned spray patterns will overlap in this common plane at or above the water's surface substantially for the highest level of water anticipated below the boom. Thus, in FIG. 6, if the highest wave peak anticipated is shown at location P beneath the boom 18, it will be noted that the spray patterns S1 and S2 overlap slightly at or above the water level at the peak. This is an important factor in the design of the boom because any appreciable gap in the spray pattern curtain incident upon the water along the length of the curtain allows oil being confined between the booms to escape through the gap and thus be missed in the sweep of the vessel in running its swath through an oil spill.

Again, with reference to FIG. 2, a series of arrows B have been drawn which are indented to depict air flow induced by the sprays of fine water droplets. This air entrained with the water spray by induction, mixes with the streams of droplets to increase the composite volume of fluid (air and water) incident upon the underlying body of and thereby helps carry the oil in the direction of the horizontal component of the spray pattern as it impinges the water's surface. Some of the entrained air is drawn from the outside (i.e. outside the space between the booms) and some is drawn from the space between booms above the water's surface. The spray droplets have a direct effect themselves on movement of the surface oil. However the air flow which the sprays induce is believed to be a major factor in the effectiveness of the system. In this connection it will be noted that formation of a sheet or curtain of spray made up of fine droplets directed against the surface in the described manner permits the nozzle booms 18 to be located well above the water surface where they must be in order to clean the highest wave peaks anticipated. Because the water droplets, however small, have vastly more momentum than air molecules can have, the water provides the necessary carrying effect to project the force of the composite flow of air and water down to the spill surface. Air alone emitted from nozzles booms in the locations of the booms 18 is unsatisfactory for the reasons previously described in the introductory remarks.

It is found that for a practical elevation of the spray booms above the water level, the small droplets produced by the spray nozzles at practical operating water pressures in the booms should be made sufficiently small that, while they still have the desired carrying effect, they nevertheless do not individually possess sufficient energy to disperse and/or emulsify the oil upon impact therewith. The parameters which affect this relationship include the water pressure used, the elevation of the spray booms above the surface of the water, and the effectiveness of the nozzle orifices to break up the stream of water into a spray of fine droplets. Since these parameters may vary and are readily determined by emperical methods of different applications, there is no critical relationship to be defined in formulatic limiting terms. However, as an example, with a water pressure of about 40 pounds per square inch, booms located above the water's surface by about 2 feet and spray nozzles spaced about 2 feet apart along the boom and of the Vee Jet Nozzle type (Model HU8030) produced by Spraying Systems Company of Wheaton, Illinois, the desired effects are achieved. These nozzles are especially designed for use in a linear array to produce a uniform spray curtain, their spray pattern edges being tapered so that overlap is possible without disturbing composite pattern uniformity. Because increasing water pressure propels the droplets with greater velocity but simultaneously decreases their size somewhat, and vice versa, water pressure itself is not highly critical due to the offsetting or compensating effects on any tendency to disperse or break up the oil into an emulsion or unduly small droplets.

Preferably, each of the booms 18 also carries, at its outer end, an additional fan spay nozzle 100 oriented so that the wide dimension of the spray is substantially at right angles to the length of the boom whereby the outer edge (i.e., outer in the sense of away from the region between the booms) where that spray impacts the underlying water's surface lies outwardly beyond the end of the boom. The purpose of this additional spray is to create an edge effect for the system. Force of this spray and entrained air tending to deflect the adjacent areas of oil spill which is not picked in the collecting swath of the funneling booms laterally away from the path of the vessel, as shown by the edge flow lines L in FIG. 3. This edge effect helps make a clean break between the swept and unswept regions of the oil spill, such that there is less tendency for the surrounding oil to close inwardly upon the vessel. This makes each sweep path of the vessel more readily visible and helps to keep the adjacent spill from spreading back over an area just swept.

In FIGS. 1, 3 and 7 it will be noted that the sprays produced by the nozzles 52 on boom 50 are inclined toward the entrance of the recovery vessel and thereby tend to produce a current of air and water spray in the direction of the vessel's pick-up belt entrance or throat. As already mentioned, this assists in the recovery effectiveness of the system when the vessel is not underway or the surrounding water is not moving at a substantial speed in relation to the vessel. Under these conditions the spray boom 50 is effective to create a current helping to bring the oil spill to the pick-up belt. Furthermore, when operating the system under adverse windy conditions even with the vessel 10 underway, it may be desirable at times to place the boom 50 into operation in order to insure a more positive and consistent movement of the collected oil into and through the pick-up belt in the recovery device 14.

These and other aspects of the invention as defined within the scope of the claims which follow will be evident from an understanding of the operating principles and essential aspects of the illustrative embodiment.

What is claimed is:

1. The method of sweeping or confining an oil spill on open water in relation to a selected surface area, comprising forming a curtain of water spray directed downwardly from a selected height above, and at an incline toward, said surface area so as to impact the water's surface along an edge of said area, the volumetric flow rate per unit of surface area impacted by the spray, together with the spray velocity, being sufficient when combined with air entrained by the spray, to move the oil ahead of the spray into the said area, the spray discharge comprising discrete droplets of such limited size and discharge velocity as to avoid substantially breaking up and dispersing the oil by such impact.

2. The method defined in claim 1, wherein the spray curtain is formed by a plurality of spray discharges spaced apart along a line generally parallel to and above said edge, comprising spray discharge patterns that overlap on impact at the water's surface, thereby to avoid gaps in the curtain of spray through which oil may flow out of said area.

3. The method defined in claim 2 wherein the spray discharge patterns comprise generally paddle-shaped patterns having maximum divergence angle in a plane common to said spray discharges and a substantially lesser discharge angle in directions perpendicular to said plane.

4. The method defined in claim 3 wherein the spray discharges are formed from a height above the water's surface which varies with the passage of waves and swells beneath the same, and wherein the overlap of the spray discharge patterns impacting the water's surface continues to the troughs or bases of the waves and swells.

5. An oil spill sweep or confinement apparatus for operation on open water, comprising nozzle means configured and arranged to discharge water as a fine spray from at least one line of successively spaced discrete spray source locations, thereby to form effectively at least one cross-sectionally elongated spray curtain pattern of successively overlapping individual sprays, means for positioning the nozzle means, with the line of spray source locations defined thereby disposed generally horizontally at an elevation above the water's surface and with the spray curtain pattern extending at an incline to such surface, and pump and associated conduit means operatively connected to deliver water to the nozzle means under pressure that projects force of the spray and with it air entrained by the spray against the water's surface sufficient to move the oil across the water without substantial dispersement or emulsification of the oil.

6. The apparatus defined in claim 5, wherein the nozzle means comprises an elongated spray boom with a succession of individual spray nozzles mounted at spaced locations along said boom, each with cross-sectionally thin and elongated fan-shaped spray patterns directed in plane at approximately 45° to the water's surface and arranged closely enough to overlap at or above the water's surface so as to avoid the occurrence of any substantial gap in the spray pattern impacting the water.

7. The apparatus defined in claim 6, wherein there are two such elongated spray booms disposed substantially in a common horizontal plane with the spray curtain patterns therefrom inclined toward each other so as to form an oil comfinement area between and beneath the booms.

8. In combination, oil spill recovery apparatus operable on open water by relative movement between the apparatus and the surface oil and associated surface water to effect passage of the latter into and through the apparatus, and means supported and operated in physical association with said apparatus to guide and direct the surface oil and associated surface water into the apparatus comprising nozzle means configured and arranged to discharge water in substantially parallel directions as a fine spray from at least one line of successively spaced discrete spray source locations, thereby to form effectively at least one cross-sectionally elongated spray curtain pattern, means for positioning the nozzle means, with the line of spray source locations defined thereby disposed in positional relationship with the recovery apparatus generally horizontally at an elevation above the water's surface and with the spray curtain pattern extending at an incline to such surface, and pump and associated conduit means operatively connected to deliver water to the nozzle means under pressure that projects force of the spray and with it air entrained by the spray against the water's surface sufficient to move the oil across the water into position for entering the recovery apparatus without substantial dispersement or emulsification of the oil.

9. The combination defined in claim 8 wherein the recovery apparatus comprises a mobile surface vessel.

10. The combination defined in claim 9, wherein the nozzle means comprises an elongated spray boom projecting forwardly from the surface vessel with a succession of individual spray nozzles mounted at spaced locations along said boom, each with cross-sectionally thin and elongated fan-shaped spray patterns directed in a plane at approximately 45° to the water's surface and arranged closely enough to overlap at or above the water's surface so as to avoid the occurrence of any substantial gap in the spray pattern impacting the water.

11. The combination defined in claim 10, wherein there are two such elongated spray booms disposed substantially in a common horizontal plane and projecting in mutually divergent relationship forwardly from the surface vessel on opposite sides thereof, with the spray curtain patterns therefrom inclined toward each other so as to form an oil confinement area between and beneath the booms.

12. Means for sweeping or confining an oil spill on open water without substantial dispersal or emulsification of the oil, comprising downwardly directed nozzle means, means maintaining the nozzle means above the water's surface, and an associated source of water under pressure supplying said nozzle means, operable to discharge through the nozzle means a fine water spray cross-sectionally of a substantially uninterrupted elongated pattern directed at an incline against the oil spill of such volume and velocity and made up of droplets predominantly in such a size range as to inductively entrain flow of air with the spray in a composite flow carried by momentum to the water's surface for moving the oil, but with insufficient droplet impact effect to produce substantial dispersal or emulsification of the oil.

13. The means defined in claim 12 wherein the nozzle means comprises a linear series of successively spaced spray nozzles each producing a relatively thin and wide fan-shaped pattern in substantially coplanar relationship in respect to their wide dimension and successively overlapping upon impact with the water's surface.

14. Oil spill recovery apparatus operable to sweep the surface of a body of water and recover floating oil therefrom, said apparatus comprising a self-propelled surface vessel, oil-water separation means disposed on said surface vessel to be traversed by water at the surface in a swath of limited width during progressive advancement of the surface vessel, elongated water spray discharge means forming a line of discharge which line extends forwardly and laterally outward from the bow of the surface vessel at an elevation above the water's surface, said spray discharge means being formed and operable to direct transversely downwardly from said line of discharge an elongated substantially uninterrupted curtain of water spray inclined laterally inward toward the path of advancement of the surface vessel, and water pressure supply means on the surface vessel drawing from the surrounding water and operatively connected to the spray discharge means so as to provide, through said spray discharge means, a spray curtain of water droplets which entrain air effectively to sweep floating oil into said swath from regions laterally beyond the forward projection thereof without materially dispersing the oil in minute droplets or emulsifying the oil.

15. Oil spill recovery apparatus operable to sweep the surface of a body of water and recover floating oil therefrom, said apparatus comprising oil-water separation means disposed and operable to be traversed by water at the surface in a swath of limited width during progressive relative movement between the water along the surface thereof and said recovery means elongated water spray discharge means mounted in positional relation to said recovery means and forming a line of discharge which line extends forwardly and laterally outward from the recovery means in relation to the swath ahead of said recovery means, said spray discharge means being supported at an elevation above the water's surface and being formed and operable to direct transversely downwardly from said line of discharge an elongated substantially uninterrupted curtain of water spray inclined laterally inward toward the swath, and water pressure supply means operatively connected to the spray discharge means so as to provide, through said spray discharge means, a spray curtain of water droplets which entrain air effectively to sweep floating oil into said swath from regions laterally beyond the forward projection thereof without materially dispersing the oil in minute droplets or emulsifying the oil.

* * * * *